(12) United States Patent
Wong et al.

(10) Patent No.: US 10,211,486 B2
(45) Date of Patent: Feb. 19, 2019

(54) BATTERY WITH BUILT-IN WIRELESS COMMUNICATION

(71) Applicant: QDroid Inc., Seattle, WA (US)

(72) Inventors: Ivy Wong, Sammamish, WA (US); Ella Xue, Flushing, NY (US)

( * ) Notice: Subject to any disclaimer, the term of this patent is extended or adjusted under 35 U.S.C. 154(b) by 14 days.

(21) Appl. No.: 15/879,529

(22) Filed: Jan. 25, 2018

(65) Prior Publication Data

US 2018/0226692 A1    Aug. 9, 2018

Related U.S. Application Data

(60) Provisional application No. 62/454,711, filed on Feb. 3, 2017.

(51) Int. Cl.
*H02J 7/00* (2006.01)
*H01M 10/42* (2006.01)
*H01M 10/48* (2006.01)
*H01M 10/058* (2010.01)

(52) U.S. Cl.
CPC ....... *H01M 10/4257* (2013.01); *H01M 10/48* (2013.01); *H01M 10/486* (2013.01); *H01M 10/058* (2013.01); *H01M 2010/4271* (2013.01); *H01M 2010/4278* (2013.01); *H01M 2220/30* (2013.01)

(58) Field of Classification Search
CPC .......... H01M 10/4257; H01M 10/486; H01M 10/058; H01M 10/4271; H01M 10/4278; H01M 10/44; H01M 10/441; H01M 10/446; H01M 10/46; H01M 10/48; H01M 10/482; H01M 10/488; H02J 7/0011; H02J 7/0042; H02J 7/0047; H02J 7/007
See application file for complete search history.

(56) References Cited

U.S. PATENT DOCUMENTS

| | | | | |
|---|---|---|---|---|
| 5,541,490 A | * | 7/1996 | Sengupta | G01R 31/3624 320/160 |
| 2014/0077769 A1 | * | 3/2014 | Maleki | H02J 7/008 320/136 |
| 2018/0109126 A1 | * | 4/2018 | Gavriliu | H02J 7/0052 |

* cited by examiner

*Primary Examiner* — Nathaniel R Pelton
*Assistant Examiner* — Michael N Dibenedetto
(74) *Attorney, Agent, or Firm* — RC Trademark Company

(57) ABSTRACT

The present embodiments relate to a battery that comprises one or more battery cells and a logic unit embedded within the battery to receive data from a plurality of sensors that are also embedded within the battery. A wireless transceiver embedded within the battery communicates with the logic unit. A voltage controller embedded within the battery receives instructions from the logic unit and a voltage regulator and a current limiter that are also embedded within the battery controls an output of the battery based on one or more signals from the voltage controller.

12 Claims, 2 Drawing Sheets

BATTERY WITH BUILT-IN WIRELESS COMMUNICATION

FIELD OF THE INVENTION

This disclosure relates to a power supply system, and more particularly, a battery with built-in wireless communication capabilities.

BACKGROUND OF THE INVENTION

As portable electronic device technology advances in an attempt to address a myriad of everyday business, communication, and other technological needs, issues such as battery functionality remain key considerations in power supply system design process.

Much attention is typically placed on the power source of portable electronic devices, which have become ubiquitous in modern life. Battery size and capacity, for example, significantly impact the configuration of the device on which it is installed.

Generally, battery functionality is limited to providing a source of power. In this regard, any functionality of a device resulting from receiving battery power relies solely on the device itself. Therefore, a more dynamic power supply system that can serve as a secondary source of a functionality of a device, and/or that can provide additional functions is desired. In this regard, the invention described herein addresses this problem.

SUMMARY OF THE INVENTION

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

The present embodiments relate to a battery that comprises one or more battery cells and a logic unit embedded within the battery to receive data from a plurality of sensors that are also embedded within the battery. A wireless transceiver embedded within the battery communicates with the logic unit. A voltage and current controller embedded within the battery receives instructions from the logic unit and a voltage regulator that is also embedded within the battery controls an output of the battery based on one or more signals from the voltage controller. An embedded current limiter controls a current output from the battery.

In some embodiments, the wireless transceiver of the battery is configured to transmit signals to an electronic device, whereby the signals can be used to determine the location, position, and/or the distance of the battery or the device to which the battery is connected. Additionally, the signals can be used to control the battery.

In some embodiments, the wireless transceiver of the battery is configured to transmit signals to the electronic device, whereby the signals comprise status information relating to the battery. Non-limiting examples of the status information comprise the battery level, battery temperature, a charging or discharging current and voltage measurements. In this regard, the present embodiments relate to resolving the problems of locating missing devices, determining a battery status, and controlling the battery.

DETAILED DESCRIPTION OF THE INVENTION

Figure 1:
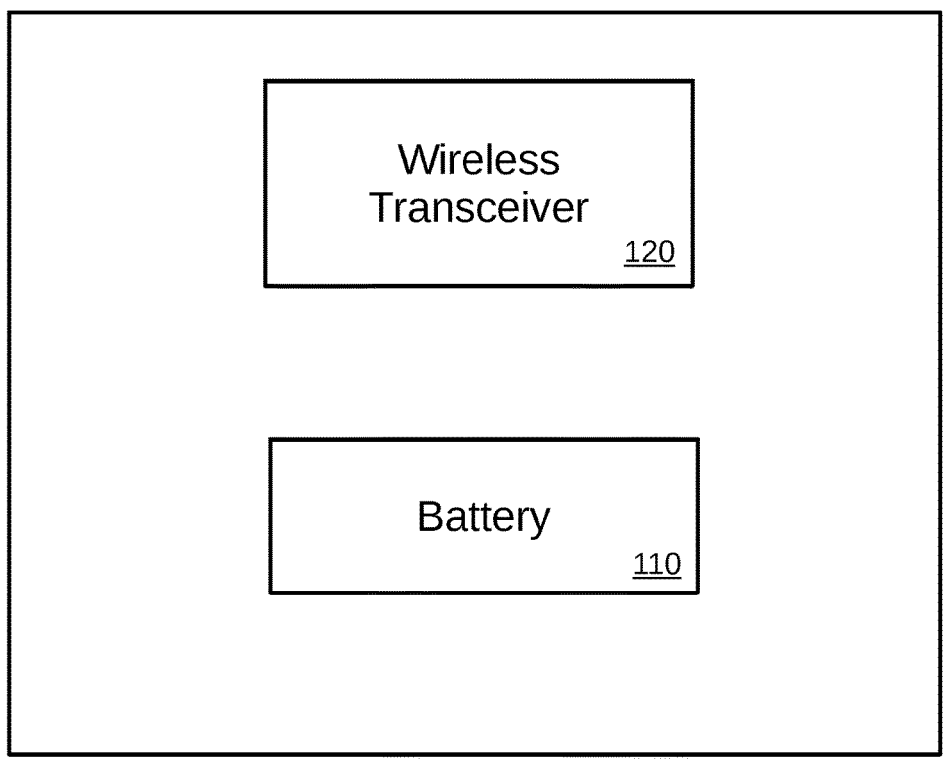
FIG. 1 illustrates a high-level block diagram of a battery connected to an electronic device according to some embodiments.

Referring now to FIG. 1, an electronic device 100 is illustrated according to some embodiments. The electronic device may comprise a battery 110 and a wireless radio (e.g., a wireless transceiver). The battery 110 may comprise various types of batteries of various sizes and capacities as known in the art. Without limitation, the battery 100 may comprise primary cells or non-rechargeable batteries and secondary cells or rechargeable batteries, depending upon embodiments.

The wireless transceiver 120 may be integral to the battery 110. The wireless transceiver 120 may communicate using various types of wireless communication protocols. In this regard, the battery may be configured to establish a wireless connection to at least one electronic device, wherein the electronic device comprises a computing system, a controller, a handheld device, and/or other types of electronic devices. It is contemplated that the battery can establish a connection or pair with the electronic device using various methods and security protocols known in the art.

In some embodiments, the battery may broadcast or emit signals automatically, at regular intervals, depending upon embodiments to send information to the electronic device for example, in response to a command or a user input received via a user interface of the electronic device. Non-limiting examples of the information that can be transmitted to the electronic device include a battery voltage or current level and a temperature of the battery. In this regard, the electronic device may monitor a battery status thereby eliminating the need to physically examine the battery. In some embodiments, the battery 110 may transmit signals to an external electronic device. For example, the external device (not shown in FIG. 1) may comprise software to determine a location of the battery (and the electronic device that the battery is installed in) based on a signal strength of a signal produced by the wireless transceiver 120.

In some embodiments, the battery may be configured to respond to the electronic device by performing actions in response to certain commands or user input received via the user interface of the electronic device. In some embodiments, the commands that are received at the battery may be sent through an established connection or via broadcast messages. For example, the electronic device can be configured to send commands to turn on or turn off the battery, to go into a low-power mode (e.g., operate at a lower voltage), or to generate alerts (e.g., visual, audible, tactile, etc.). In some embodiments, the battery may also go into a high-power mode (e.g., operate at a higher voltage) in response to a command from the electronic device. For example, a high power mode may be needed to increase an output volume (e.g., audio volume) of the electronic device or to increase a brightness (e.g., increase voltage to the screen) of the electronic device. Other examples may comprise (i) supplying different voltage levels to a testing/engineering instrument to determine an optimum operating voltage and/or current and (ii) supplying a higher voltage to a connected electronic device in a case that the connected electronic device will be operated in an "over-clocked" mode.

Figure 2:
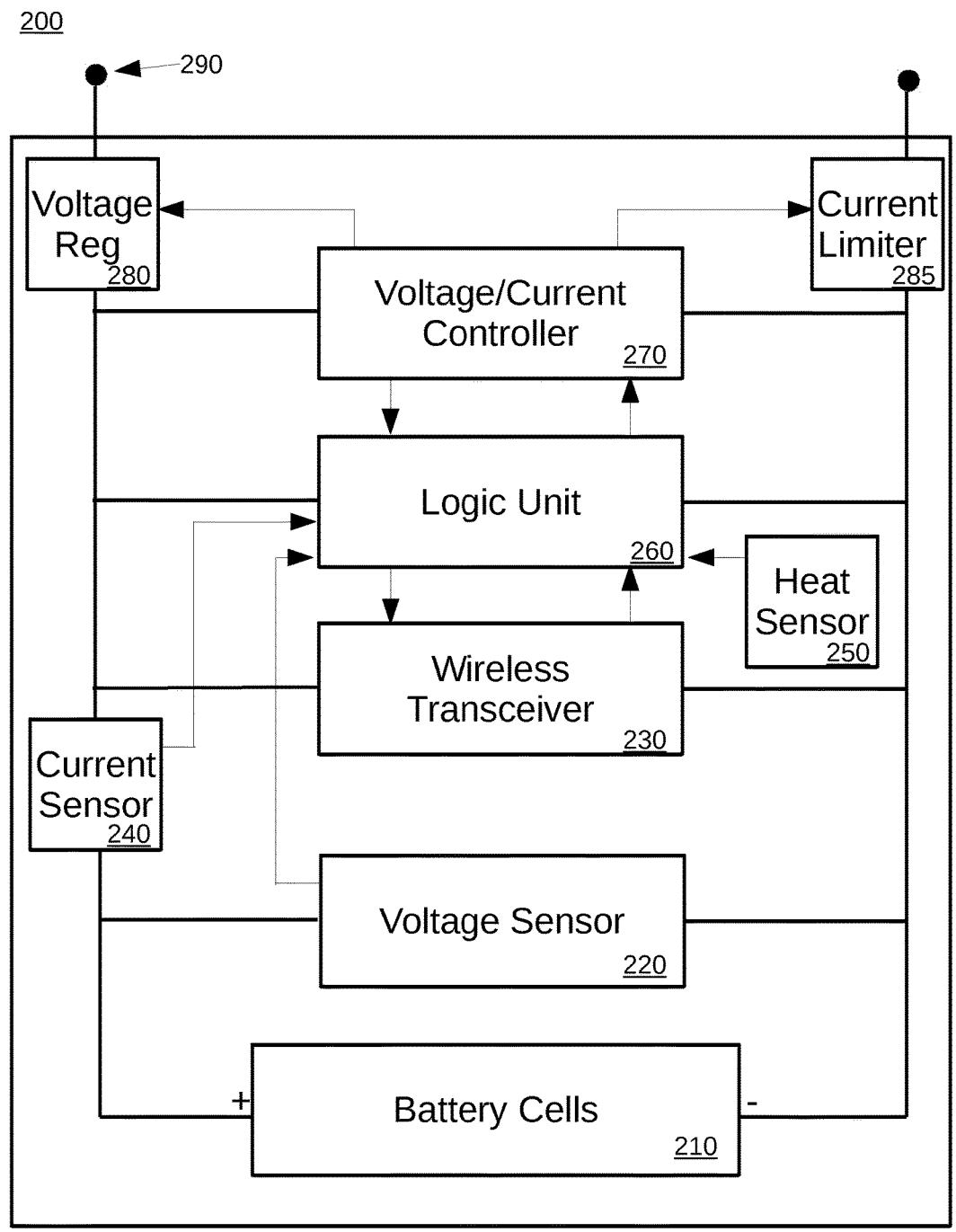
FIG. 2 illustrates a battery according to some embodiments.

Now referring to FIG. 2, an embodiment of a battery 200 is illustrated. The battery 200 may comprise one or more battery cells 210. Each battery cell 210 may comprise an electrochemical cell capable of generating electrical energy from chemical reactions. The battery may comprise a positive side and a negative side and a voltage sensor 220 may be connected across the battery (e.g., to the positive side and the negative side) to measure a voltage of the battery 200. A current sensor 240 may also be electrically coupled to the positive side of the battery cells 210 to measure a current being produced by the battery cells.

A wireless transceiver 230 may also be connected across the battery and, as such, the wireless transceiver 230 may be powered by the battery cells 210. The wireless transceiver may utilize any known wireless protocols such as IEEE 802.11, IEEE 802.15 and their associated variants (e.g., BLUETOOTH, ZIGBEE, etc.). The wireless transmitter 230 may communicate with an external electronic device to control the battery and to send data associated with the battery to the external electronic device.

The logic unit 260 may comprise a processor, memory and a non-transitory computer readable medium. The logic unit 260 may receive data from a plurality of sensors such as, but not limited to the current sensor 240, the voltage sensor 220 and a heat sensor 250 that may measure a current temperature of the battery 200. The processor may communicate with the memory which stores data within the logic unit 260. The non-transitory computer readable medium may store a program and/or processing logic for controlling the processor. The processor may perform instructions of the program and thereby may operate in accordance with any of the embodiments described herein. The program may be stored in a compiled, compressed, uncompiled and/or encrypted format or a combination thereof. The program may furthermore include other program elements, such as an operating system, a database management system, and/or device drivers used by the processor to interface with elements of the battery 200 described herein.

The logic unit 260 may receive instructions via the wireless transceiver 230 and may sent instructions to a voltage/current controller 270. In some embodiments, the instruction to the voltage/current controller 270 may be based on data received from the plurality of sensors and/or instructions provided from an external user via the electronic device (e.g., instructions to enter a low-power mode or a high-power mode)

The voltage/current controller 270 may send a signal to a voltage regulator 280 to indicate a voltage of an output 290 of the battery 200. In some embodiments, the voltage regulator 280 may also function as a current regulator to adjust a current of the battery 200.

In some embodiments, the voltage/current regulator 280 may comprise one or more resistors in series with one or more diodes. In some embodiments, the resistors may comprise variable resistors (e.g., potentiometers) that are controlled via the voltage/current controller 270 so that the voltage/current regulator 280 functions as a voltage divider. In some embodiments, the voltage/current regulator 280 may comprise an off-the-shelf voltage regulator chip. In some embodiments, a current limiter 285 may also be embedded within the battery 200. The current limiter 285 may receive instructions from the voltage/current regulator 280 to control an amount of current (e.g., control an increase or decrease of a maximum amount of current) that may be output from the battery 200 based on one or more signals from the voltage/current regulator 280. In some embodiments the current limiter 285 may simply limit the current output from the battery 200 to a user determined maximum current that may be received as a command from the user.

In some embodiments, the logic unit 260 may receive a temperature from the heat sensor 250 that indicates an operating temperature that is above a predetermined maximum. The logic unit 260, in response to the operating temperature may send instructions to the voltage/current controller 270 to operate at a lower voltage to decrease heat generated by the battery 200 or to lower a maximum limit of the current to be output from the battery.

In some embodiments, the logic unit 260 may receive an instruction from an external unit to transmit a signal at regular intervals (e.g., every second) so that an external device may determine a location of the battery 200 (and the device it is in) via determining a signal strength of the transmitted signals.

In some embodiments, the logic unit 260 may receive an instruction to power down the battery 200. For example, if a user is away from the electronic device, the user may transmit a signal from the external device to power down the battery 200 to save power while the device is not being used or the battery 200 may be instructed to stop delivering power to avoid damage or harm to people and/or real or personal property in an emergency situation. A signal to power down the battery 200 may result in a signal being sent to the voltage regulator 280 to output zero volts. Furthermore, in a case where multiple batteries are being used in multiple devices, a user may be able to turn off multiple devices using a single command that is received at each battery 200.

In some embodiments the battery 200 may comprise a AA sized battery having a length less than two inches and a diameter of less than 0.6 inches. In some embodiments, the battery 200 may comprise a PP3 size battery comprising a height less than 2 inches a width less than 1.1 inches and a depth less than 0.7 inches. In some embodiments the battery 200 may comprise a D sized battery having a diameter less than 1.5 inches and a length less than 2.5 inches. In some embodiments, the battery 200 may comprise AAA batteries, C sized batteries, car batteries, or other sized batteries associated with consumer electronic goods. In some embodiments, the battery 200 may be less than 24 inches in length. For example, a battery may be associated with a car or truck battery or other common household batteries.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

What is claimed:

1. A battery for powering an electronic device, the battery comprising:
   one or more battery cells;

a wireless transceiver embedded within the battery wherein the wireless transceiver communicates with a logic unit;

a voltage and current controller embedded within the battery to receive instructions from the logic unit;

a voltage regulator embedded within the battery to control an output of the battery based on one or more signals from the voltage and current controller, wherein a length of the battery is less than 24 inches; and the logic unit embedded within the battery to receive data from a heat sensor, a current sensor, the wireless transceiver, a voltage sensor, and the voltage and current controller within the battery, wherein in a case that the logic unit receives a command from the wireless transceiver associated with an increase of an audio output volume or an increase of voltage to a display screen, the logic unit instructs the voltage and current controller to increase a voltage output and the voltage and current controller sends an instruction to the voltage regulator to increase an output voltage, and wherein in a case that the logic unit receives an operating temperature from the heat sensor that indicates that the operating temperature above a predetermined maximum, the logic unit sends an instruction to the voltage and current controller to operate to decrease heat generated by the battery by operating at a lower voltage or lowering a maximum output current for the battery.

2. The battery of claim 1, wherein in a case that the logic unit receives an instruction from an external device, the wireless transceiver transmits a plurality of signals, each at a regular interval, for determining a location of the battery based on a signal strength of the transmitted signals.

3. The battery of claim 1, wherein the voltage regulator reduces a voltage of the battery based on the one or more signals from the voltage and current controller.

4. The battery of claim 1, wherein the voltage regulator increases a voltage of the battery based on the one or more signals from the voltage and current controller.

5. The battery of claim 1, further comprising a current limiter embedded within the battery to limit an amount of current output by the battery based on one or more signals from the voltage controller and current controller.

6. A battery, comprising:
one or more battery cells;
a logic unit embedded within the battery to receive data from a plurality of sensors embedded within the battery and to transmit a signal to a voltage and current controller to control an output of the battery in response to an instruction received from an external device;
and a wireless transceiver embedded within the battery wherein the wireless transceiver communicates with the logic unit, wherein a length of the battery is less than 24 inches, and wherein in a case that the logic unit receives an instruction from the external device, the wireless transceiver transmits a plurality of signals, each at a regular interval, for determining, by the external device, a location of the battery based on a signal strength of the transmitted signals,
further comprising a voltage regulator, wherein the voltage regulator reduces a voltage of the battery based on the one or more signals from a voltage and current controller,
and wherein in a case that the logic unit receives a command from the wireless transceiver associated with an increase of an audio output volume or an increase of voltage to a display screen, the logic unit instructs the voltage and current controller to increase a voltage output and the voltage and current controller sends an instruction to the voltage regulator to increase an output voltage, and wherein in a case that the logic unit receives an operating temperature from the heat sensor that indicates that the operating temperature is above a predetermined maximum, the logic unit sends an instruction to the voltage and current controller to operate to decrease heat generated by the battery by operating at a lower voltage or lowering a maximum output current for the battery.

7. The battery of claim 6, wherein the plurality of sensors comprise a heat sensor and a current sensor.

8. The battery of claim 6, wherein the voltage regulator increases a voltage of the battery based on the one or more signals from the voltage and current controller.

9. The battery of claim 6, further comprising a current limiter embedded within the battery to limit an amount of current output by the battery based on one or more signals from the voltage controller and current controller.

10. A battery for powering an electronic device, the battery comprising:
one or more battery cells;
a logic unit embedded within the battery to receive data from a plurality of sensors embedded within the battery;
a wireless transceiver embedded within the battery wherein the wireless transceiver communicates with the logic unit;
a voltage and current controller embedded within the battery to receive instructions from the logic unit;
a voltage regulator embedded within the battery to control an output of the battery based on one or more signals from the voltage and current controller, wherein a length of the battery is less than 24 inches; and
a logic unit embedded within the battery to receive data from a heat sensor, a current sensor, the wireless transceiver, a voltage sensor, and the voltage and current controller plurality of sensors embedded within the battery,
wherein in a case that the logic unit receives a command from the wireless transceiver associated with an increase of an audio output volume or an increase of voltage to a display screen, the logic unit instructs the voltage and current controller to increase a voltage output and the voltage and current controller sends an instruction to the voltage regulator to increase an output voltage,
wherein in a case that the logic unit receives an operating temperature from the heat sensor that indicates that the operating temperature above a predetermined maximum, the logic unit sends an instruction to the voltage and current controller to operate to decrease heat generated by the battery by operating at a lower voltage or lowering a maximum output current for the battery; and
wherein in a case that the logic unit receives an instruction from an external device, the wireless transceiver transmits a plurality of signals, each at a regular interval, for determining a location of the battery based on a signal strength of the transmitted signals.

11. The battery of claim 10, wherein the voltage regulator reduces a voltage of the battery based on the one or more signals from the voltage controller.

12. The battery of claim 10, wherein the voltage regulator increases a voltage of the battery based on the one or more signals from the voltage controller.

* * * * *